Sept. 19, 1967  J. PISTEY ETAL  3,343,041
ELECTRICAL POWER CENTER
Filed Aug. 8, 1966  3 Sheets-Sheet 3

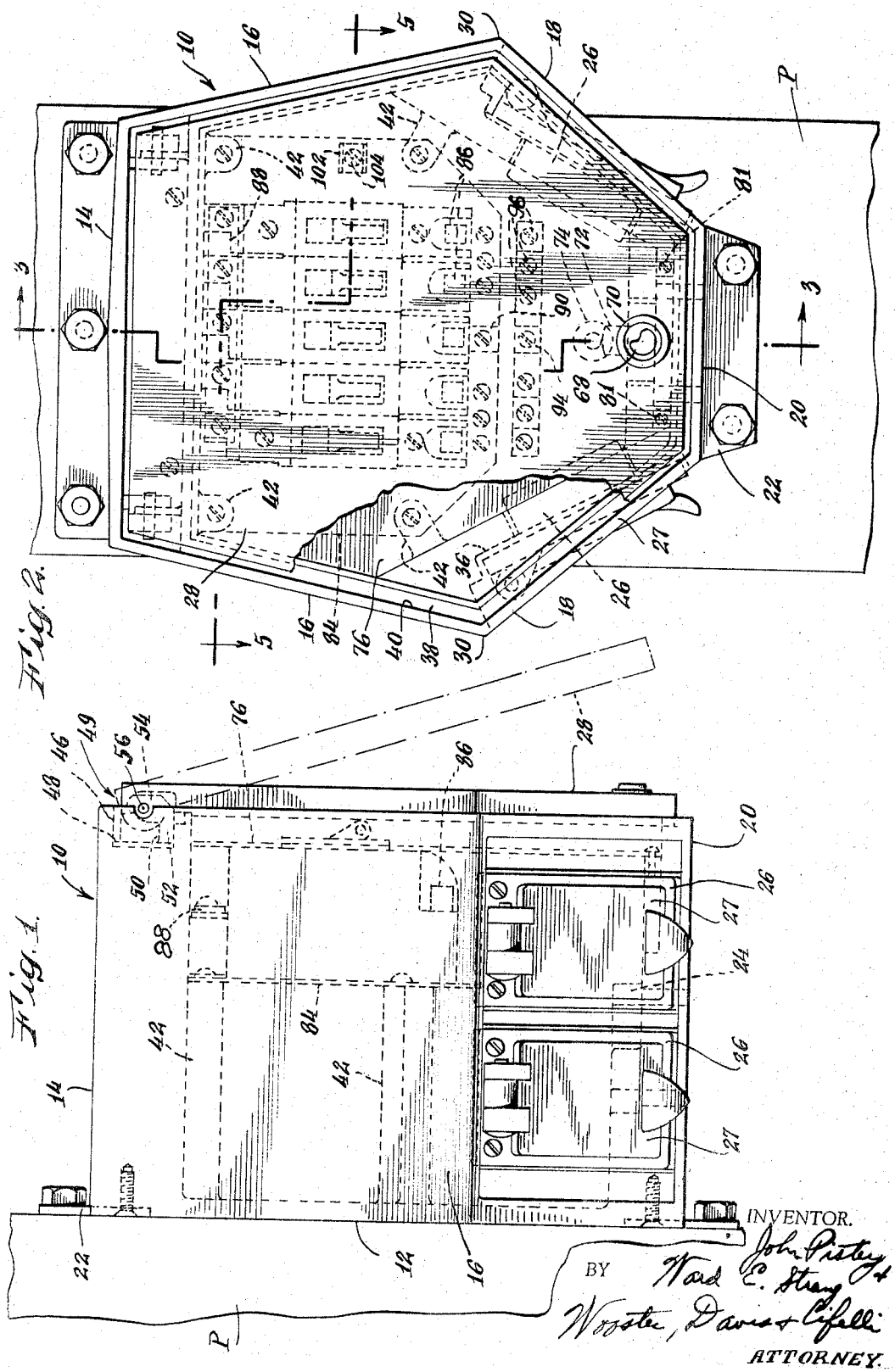

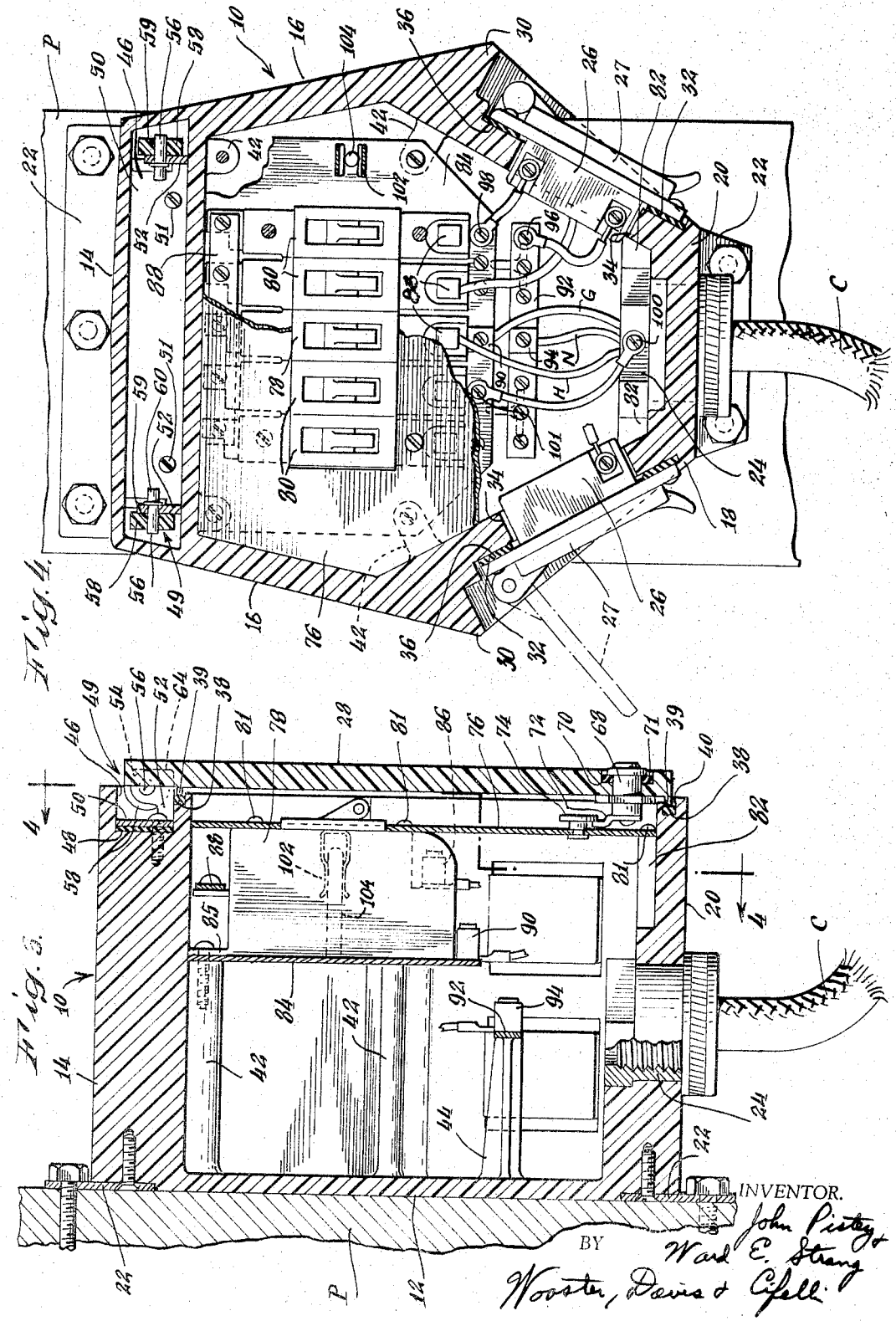

INVENTOR.
John Pistey +
Ward E. Strang
Wooster, Davis & Cifelli
ATTORNEY.

United States Patent Office 3,343,041
Patented Sept. 19, 1967

3,343,041
ELECTRICAL POWER CENTER
John Pistey, Fairfield, and Ward E. Strang, Bridgeport, Conn., assignors to Harvey Hubbell, Incorporated, Bridgeport, Conn., a corporation of Connecticut
Filed Aug. 8, 1966, Ser. No. 571,004
14 Claims. (Cl. 317—99)

ABSTRACT OF THE DISCLOSURE

A prewired unit handled electrical power center including a receptacle box having a plurality of outlet receptacles mounted through the side walls, each electrically connected to a grounding plate and a neutral bus bar housed within the box and also connected to its own power rated housed circuit breaker interposed between the power cable and the outlet receptacle, the receptacle box having a hinged door for closing its open front face and laterally sloping top wall and upper side wall portions.

---

This invention relates to an electrical power center and more particularly to an improved unit handled non-hazardous power center which is especially adapted to be located and used outdoors such as marinas, railroad yards, airports, and various industrial areas, where it in exposed to corrosive environments.

Electrical power centers of the known prior art type generally comprise one or more individual outlet receptacles of a given power rating mounted upon a wall or standard. Where it is specifically desired to provide a plurality of outlet receptacles at a given location, it is known to mount them on a power supply box. Such a box is generally constructed of metal in a rectangular shape and has a usual door disposed at its front face for access to the internal components. These conventional power supply boxes and their components are not designed to withstand the corrosive effects and rough service conditions associated with outdoor location and use. The known devices soon succumb to corrosion caused by salt spray, moisture, brine, oil, grease and various chemicals, such as acids.

Accordingly, it is the primary object of this invention to provide an electrical power center which is adapted in use to be exposed to corrosive environments and, particularly, one to be used outdoors in such places as marinas and the like and which is designed to protect the internal components from all deleterious effects of the environment.

Another object is to provide an improved electrical power center having a durable access door which may be sealingly secured to the box of the power center by a unique invisible hinge and wherein the door is selectively lockable by a weather resistant, tamperproof lock.

A further object of the invention is to provide an improved electrical power center having a plurality of outlet receptacles that may be of a variety of power ratings, within permissible limits, whereby considerable power flexibility is afforded.

Still another object is to provide an electrical power center having a plurality of outlet receptacles having circuit breakers in each branch outlet line, and a main circuit breaker in the main power supply line to protect each outlet receptacle for its allowable power rating.

A still further object is to provide a non-hazardous electrical power center in which all exposed metal parts are safely grounded.

To accomplish these objects, in one form an electric power center is provided which comprises an insulating receptacle box made of a durable, strong, electrical insulating material, such as a reinforced plastic, including a hinged locking door and having a fitting in an aperture through the bottom of the box arranged to receive an electrical power supply cable. The receptacle box is further provided with a plurality of outlet receptacles and a plurality of circuit breakers housed within the box and electrically connected between the electrical power supply cable and the outlet receptacles. Equipment grounding means is disposed within the box and arranged to be connected to a grounding wire of the electrical power supply cable. The receptacle box is still further provided with a face plate which is arranged to be connected to the equipment grounding means and is accessible when the hinged door is opened.

Other objects and further details of that which we believe to be novel and our invention will be clear from the following description and claims taken with the accompanying drawings, wherein:

FIG. 1 is a left side elevational view of the improved power center showing the hinged door in phantom lines in a partially opened position to which it may be selectively moved;

FIG. 2 is a front elevational view of the power center with the door partially broken away to show a portion of the face plate;

FIG. 3 is a sectional view taken substantially along line 3—3 of FIG. 2 showing the interior of the box;

FIG. 4 is a sectional view taken substantially along line 4—4 of FIG. 3 showing the circuit breakers mounted upon the equipment grounding plate;

Figure 5:
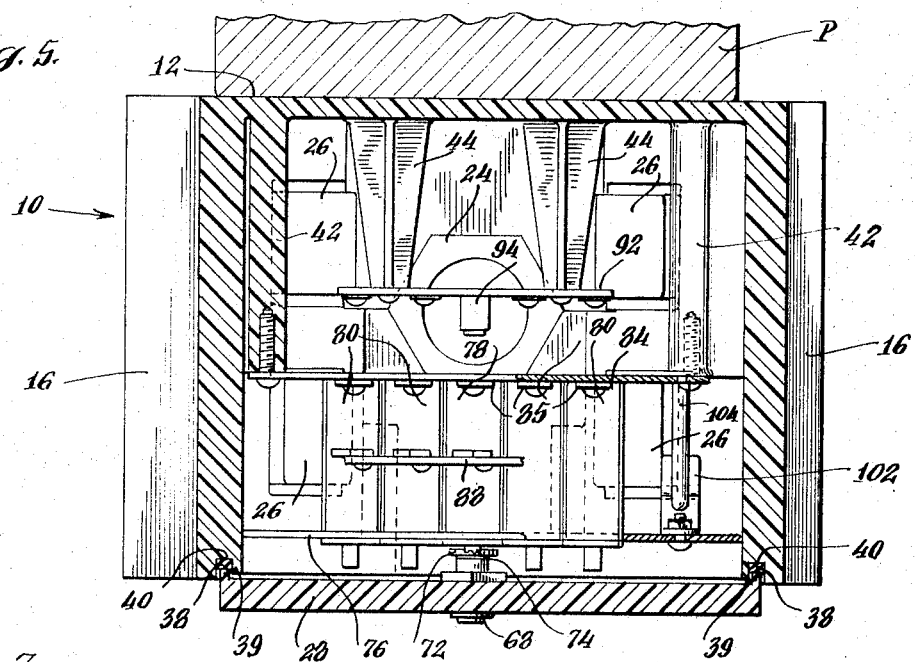
FIG. 5 is a sectional view taken substantially along line 5—5 of FIG. 2 and showing the supporting ribs and bus bars in the interior of the box.

With particular reference to the drawings, there is illustrated a receptacle box 10 which is constructed of a durable, strong, electrical insulating material, such as any suitable, available reinforcing plastic material, one of which is sold as Fiberglas®. The receptacle box is of generally hexagonal shape having a rear wall 12, a top wall 14, generally vertically extending sidewalls including outwardly sloping upper side wall portions 16, and inwardly sloping lower side wall portions 18, a bottom wall 20, and being open at its front face. The receptacle box 10 has removably secured upon the exterior surface of its rear wall the mounting brackets 22, which are preferably made of a corrosion resistant metal, such as stainless steel, and which can be secured to any flat surface, such as the pillar P shown in the drawings. The brackets are removable and, therefore, can be replaced with suitable curved brackets, and the receptacle box can alternatively be mounted upon a cylindrical piling if desired. Molded into the bottom wall 20 of the box is a metallic conduit bushing 24 through which the power supply electrical cable C extends. The inwardly sloping lower side wall portions 18 have apertures 34 which accept four external outlet receptacles 26, two on each side, which are secured to and protected by cover assemblies including spring loaded gasketed insulating lift covers 27, one of which is shown in the open position in FIG. 4, which are biased to snap shut when the outlet is not in use. The open front face of the box 10 is arranged to be closed by a locking hinged access door 28, which may be made of the same insulating material as the box.

Figures 6, 7:
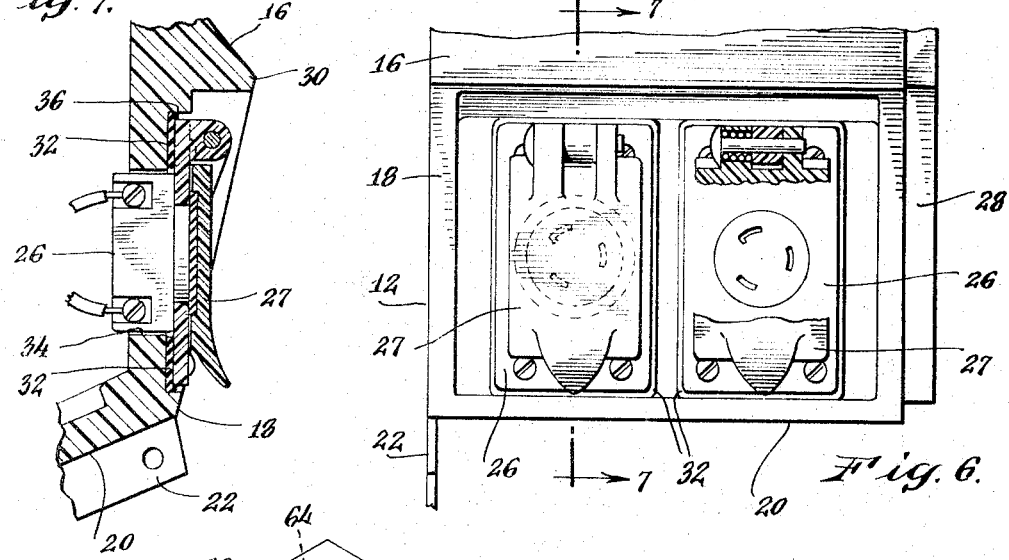
FIG. 6 is a fragmentary left side elevational view taken perpendicular to the lift covers of the receptacle outlets.
FIG. 7 is a fragmentary view taken substantially along line 7—7 of FIG. 6 showing in detail the lift cover disposed over the outlet receptacle.
Figure 8:
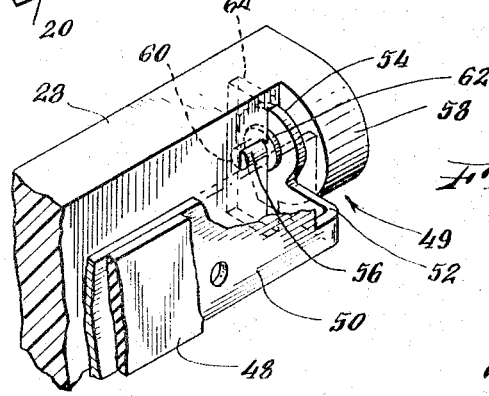
FIG. 8 is an enlarged fragmentary perspective view of one of the door hinge members as viewed from the box.

The receptacle box 10 is designed specifically in the described, generally hexagonal shape so that it will shed rain water. The top wall 14 has a slight peak at its center, to create a slight downward slope to both sides, causing rain water to move and run down the outwardly sloping upper side wall portions 16 over the eave-like drip shields 30, onto the ground. This box design prohibits water from standing on the top wall or running down the sides of the box into the receptacle area. The receptacle box 10 is further weatherproofed by seals which are disposed at all the openings in the box, such as the rubber gaskets 32 disposed about the receptacle apertures 34 in the receptacle seats 36 (see FIG. 7). A similar weatherproofing seal is provided at the open front face of the box, comprising a rubber gasket 38 disposed in a channel 40 located in the front edges of the top, bottom and side walls and extending entirely around the opening at the front of the box. The rubber gasket 38 is held under sealed compression load, by a peripheral bead 39 located upon the inner wall of the door 28 when the door is closed and locked. A function of the rubber gasket seal at the door area in addition to sealing out the environment is to provide arc protection for the environment.

At the interior of the receptacle box are located integrally molded formations including ground plate supporting posts 42 and bus bar supporting posts 44. These supported electrical components will be discussed subsequently.

Located at the top of the box is a channel 46 within which is mounted a rubber gasket 48 and the invisible door hinge 49. The hinge 49 comprises a bracket 50 that is secured to the box by screws 51 in the channel and includes at its extremities upstanding pivot arms 52 having circular portions 54. The portions 54 are centrally apertured to allow hinge pins 56 carried by the door to pass therethrough. At the top of the door 28 are located opposed upstanding, semicylindrical bosses 58 having aligned apertures 59 arranged to receive the hinge pins 56. Aligned with the apertures 59 and located in the inner surface of the door 28 are concave recesses 60 arranged to receive and locate portions of the hinge pins 56 which are secured in place by the spring rings 62 that seat in annular grooves in the pins. Slots 64 are also formed in the inner surface of the door 28 in which the circular portions 54 of the hinge rotate freely. The invisible hinge constructed as described, enhances the appearance of the box 10, insures that no unnecessary water-retaining traps are present and prevents tampering.

The door 28 has a lock and key arrangement to provide controlled access to the interior of the box. The door lock 68 is a weather resistant tumbler type lock of known construction which is mounted in the door 28 in a recessed seat 70 sealed by gasket 71. Rotation of the key causes the rotatable hasp 72 at the interior of the door to be rotated into and out of locking engagement with a headed locking pin 74 secured to the dead front shield plate 76. The shield plate 76 serves as an internal cover to conceal the internal electrical components and connections. When the shield plate 76 is in place, only the resetting handle portions of the main circuit breaker 78 and the branch circuit breakers 80 are visible. The shield plate 76 is removably mounted upon the circuit breakers 78, 80 and the molded bosses 82 by securing screws 81.

An equipment round plate 84, mounted upon the supporting posts 42, supports the bank of circuit breakers 78, 80 which are secured to the plate 84 by suitable securing screws passing through mounting feet 85. The circuit breakers are of the magnetic type, which have a minimum response to environmental temperature changes, since in environments where the internal box temperature may reach 120° F., a thermal breaker would not be acceptable. Each of the circuit breakers is provided with a usual clamp type terminal 86, to which are connected the "hot" wires which carry current from a power source. The clamp type terminal of the main circuit breaker is arranged to receive the "hot" wire H from the electrical cable C, and the line current passes from the main circuit breaker 78 to the branch circuit breakers through the line bus bar 88 to which all the circuit breakers are connected. Another clamp type terminal 90 is located upon the equipment ground plate 84 and is arranged to receive a ground wire G from the electrical cable C. A "neutral" bus bar 92 is mounted upon the supporting posts 44 and is also provided with a clamp type terminal 94 which is arranged to receive a neutral wire N from the electrical cable C.

Each outlet receptacle 26 is provided with three electrical terminals (hot, neutral and ground) from which wires are connected to a clamp type terminal 86 on one of the branch circuit breakers 80 (hot wire), to one of the terminal screws 96 on the neutral bus bar 92 (neutral wire) and to one of the terminal screws 98 on the ground plate 84 (ground wire).

The conduit bushing 24 is electrically connected by a grounding wire secured to the terminal screw 100 that is connected to ground plate 84 by terminal screw 101. Grounding means are also provided for the shield plate 76 in the form of a spring clip 102 secured to the rear face of the shield plate which is arranged to slide over an elongated grounding stud 104 mounted upon the ground plate 84.

Briefly tracing the current flow through one of the branch circuits it can readily be seen that line current flows from the hot wire H of electrical supply cable C through the main circuit breaker 78 from which it flows through the line bus bar 88 to each of the branch circuit breakers 80. The line current then flows through one of the branch circuit breakers, to an outlet receptacle 26, to and through a suitable connector cap and equipment supply line to the desired electrical equipment. The current flows back to the outlet receptacle through the equipment supply line and to the neutral bus bar 92, completing the circuit back through the neutral wire N of the supply cable. The equipment ground can be traced through the ground wire G of the electrical cable C to the equipment ground plate 84, then to the outlet receptacle, to and through a suitable connector cap and equipment supply line to the desired electrical equipment.

A major advantage of this electrical power center is its power flexibility. The basic combination of outlet receptacle ratings available at single phase 115 volts A.C. are (a) four 30 amperes (b) two 20 and two 30 amperes, and (c) two 30 and two 50 amperes. Various combinations of power ratings at single phase 115/220 volts and 220 volts A.C. may be set up. Additionally, the power center will accommodate two 50 ampere Edison receptacles. The individual branch circuit breakers 80 are each rated to their corresponding outlet receptacles, and the main circuit breaker 78 is rated to the line current. Thus, each outlet receptacle is properly protected for its allowable power rating. The units, while specifically designed to accept four outlet receptacles, can also be provided with two outlet receptacles and two blank receptacle areas, and the main circuit breaker may be eliminated if local electrical codes permit.

All the internal wiring is provided at the factory. In wiring the receptacle box 10 for use at its ultimate location, the internal dead front shield plate 76 is removed and three electrical connections are completed (hot, neutral and equipment ground) from the power supply electrical cable C. The shield plate 76 is returned to and secured in its original position, and the box door 28 is closed and locked.

The power capability and flexibility of receptacle arrangements, durability of materials, controlled access to the circuit breaker area, and the protection afforded from environmental elements makes this electrical power center especially useful in such areas as marinas, railroad yards, airports and other areas exposed to the corrosive elements.

It is understood that the present disclosure has been made by way of example, and that numerous changes in details of construction and the combination and arrangement of parts may be resorted to without departure from the true spirit and the scope of the invention as hereinafter claimed.

What we claim as new and desire to secure by Letters Patent of the United States is:

1. An electrical power center comprising a unit handled assembly including: a walled receptacle box having a pair of spaced generally parallelly extending side walls which are vertically disposed when said box is mounted upon a suitable support, an open front face and a wall defining an aperture arranged to receive an electrical power supply cable; a closure means hingedly secured to said box and arranged selectively to close the open front face of said box to thereby prevent access to the interior of said receptacle box; a plurality of outlet receptacles mounted in said box and individually accessible through said side walls of said box; a plurality of circuit breakers housed within said box and electrically connected between power wires of the electrical cable and each of said outlet receptacles, whereby at least one outlet receptacle is accessible through each of said side walls and each outlet receptacle is protected by a circuit breaker for its allowable power rating.

2. The electrical power center defined in claim 1 wherein said receptacle box comprises a laterally sloping top wall and said side walls include outwardly sloping side wall portions located above said outlet receptacles whereby said top wall and side wall portions are particularly adapted to direct rain water away from said outlet receptacles when said power center is vertically mounted upon the suitable support.

3. The electrical power center defined in claim 1 wherein said closure means is mounted upon said box by means of an invisible hinge which comprises: a hinge bracket secured in a channel in said box and having pivot arms disposed at the extremities of said hinge bracket; bosses disposed upon the inner face of said closure means; pivot pins for passing through said bosses and said pivot arms; and means to secure said pivot pins in place.

4. An electrical power center comprising a prewired, unit handled assembly including: a walled receptacle box having an open face and a wall defining an aperture arranged to receive an electrical power supply cable; closure means secured to said box and arranged to selectively close the open face of said box; said box and closure means being made of a moldable, durable, waterproof, corrosion resistant, electrical insulating material; integrally molded formations located at the interior of said box; a grounding plate and a neutral bus bar means supported on said formations and in electrical isolation from one another; a plurality of outlet receptacles mounted through the walls of said box; a plurality of magnetic circuit breakers housed within said box and mounted upon said grounding plate; a line bus bar means for electrically interconnecting said circuit breakers; and means located within said box for electrically connecting said circuit breakers to said outlet receptacles, and said outlet receptacles to said grounding plate and said neutral bus bar.

5. The electrical power center defined in claim 4 wherein said receptacle box is provided with a removable mounting means secured to one of its walls, whereby said box may have different shaped mounting means secured to it and may be mounted upon different shaped supports.

6. The electrical power center defined in claim 4 wherein said receptacle box is provided with sealing means comprising: a gasket seated in a channel formed in said receptacle box disposed about the periphery of the open face, said gasket arranged to be compressed by a bead disposed around the inner wall of said closure means; a plurality of gasketed seats disposed in the walls of said box through which said outlet receptacles are mounted; and a plurality of spring-loaded gasketed insulating lift covers disposed over said outlet receptacles.

7. The electrical power center defined in claim 4 wherein said outlet receptacles are mounted in side walls; and said receptacle box is provided with water-proofing means comprising a laterally sloping top wall and outwardly sloping side wall portions located above said outlet receptacles whereby said box is particularly adapted to direct rain water away from said outlet receptacles, a gasket seated in a channel in said receptacle box disposed about the periphery of the open face and arranged to be compressed by a bead disposed around the inner wall of said closure means so as to effectively seal the open face of said box; a plurality of gasketed seats disposed in the side walls of said box upon which said outlet receptacles are mounted; and a plurality of spring-loaded gasketed insulating lift covers disposed over said outlet receptacles.

8. The electrical power center defined in claim 7 wherein said closure means is mounted upon said box by means of an invisible hinge which comprises: a hinge bracket secured in a channel in said box and having pivot arms disposed at the extremities of said hinge bracket; bosses disposed upon the inner face of said closure means; pivot pins arranged to pass through said bosses and said pivot arms; and means to secure said pivot pins in place.

9. The electrical power center defined in claim 4 wherein said closure means is mounted upon said box by means of an invisible hinge which comprises: a hinge bracket secured in a channel in said box and having pivot arms disposed at the extremities of said hinge bracket; bosses disposed upon the inner face of said closure means; pivot pins arranged to pass through said bosses and said pivot arms; and means to secure said pivot pins in place.

10. The electrical power center defined in claim 4 wherein one of said circuit breakers is electrically connected between said line bus bar and the line current wire of the electrical power supply cable, whereby said one circuit breaker serves as a main circuit breaker and delivers line current up to the allowable rating from the electrical power supply cable to the line bus bar.

11. The electrical power center defined in claim 4 further including a shield plate and wherein the electrical connections within said receptacle box are normally rendered inaccessible by said shield plate which is secured to said receptacle box and includes an aperture through which resetting handle portions of said circuit breakers protrude.

12. The electrical power center defined in claim 11 wherein electrical grounding means are provided for said shield plate, comprising: a spring clip secured to the inner wall of said shield plate and an elongated grounding stud mounted within said box and arranged to engage said spring clip.

13. The electrical power center defined in claim 4 wherein said closure means is provided with locking means whereby access to the interior of said receptacle box may be controlled.

14. The electrical power center defined in claim 13 wherein said locking means comprises a lock mounted in said closure means; said lock includes a key operated rotatable hasp; a shield plate is mounted in the open front face of said box and has an aperture through which portions of said circuit breakers protrude; and a headed pin is secured to said shield plate and arranged to have said rotatable hasp underlie the head of said pin to effect a locked relationship.

References Cited

FOREIGN PATENTS 618,701   2/1949   Great Britain.
1,059,528   6/1959   Germany.

ROBERT K. SCHAEFER, *Primary Examiner.*

M. GINSBURG, *Assistant Examiner.*